(12) United States Patent
Schützmann et al.

(10) Patent No.: US 8,544,893 B2
(45) Date of Patent: Oct. 1, 2013

(54) SECURITY ELEMENT COMPRISING MAGNETIC MATERIALS HAVING THE SAME REMANENCE AND A DIFFERENT COERCIVE FIELD INTENSITY

(75) Inventors: Jürgen Schützmann, Pfaffenhofen (DE); Lothar Schütt, Dachau (DE)

(73) Assignee: Giesecke & Devrient GmbH, Munich (DE)

( * ) Notice: Subject to any disclaimer, the term of this patent is extended or adjusted under 35 U.S.C. 154(b) by 1290 days.

(21) Appl. No.: 11/664,933

(22) PCT Filed: Oct. 11, 2005

(86) PCT No.: PCT/EP2005/010934
§ 371 (c)(1),
(2), (4) Date: May 28, 2008

(87) PCT Pub. No.: WO2006/042667
PCT Pub. Date: Apr. 27, 2006

(65) Prior Publication Data
US 2009/0008922 A1    Jan. 8, 2009

(30) Foreign Application Priority Data
Oct. 14, 2004  (DE) .................. 10 2004 049 999

(51) Int. Cl.
*B44F 1/12* (2006.01)
*B42D 15/10* (2006.01)
*B42D 15/00* (2006.01)
*B44C 1/14* (2006.01)
*G03G 9/083* (2006.01)
*H01F 1/03* (2006.01)
*H01F 1/04* (2006.01)

(52) U.S. Cl.
USPC .............. 283/82; 283/72; 283/67; 428/195.1; 162/140; 427/598

(58) Field of Classification Search
USPC ............ 283/82, 67, 72; 162/140; 428/195.1; 427/598
See application file for complete search history.

(56) References Cited

U.S. PATENT DOCUMENTS

| 5,614,824 A * | 3/1997 | Dames et al. .................. 324/239 |
| 6,146,773 A * | 11/2000 | Kaule .......................... 428/611 |
| 2004/0207194 A1 * | 10/2004 | Heim ............................. 283/82 |

FOREIGN PATENT DOCUMENTS

| DE | 25 45 959 | 4/1976 |
| DE | 27 45 632 | 4/1978 |

(Continued)

OTHER PUBLICATIONS

Search Report of German Patent Office regarding German Patent Application No. 10 2004 049 999.3, Oct. 27, 2005.

*Primary Examiner* — Mark Ruthkosky
*Assistant Examiner* — Laura C Dettinger
(74) *Attorney, Agent, or Firm* — Bacon & Thomas, PLLC

(57) ABSTRACT

The invention relates to a security element for protecting documents of value, which has magnetic material. Furthermore, the invention relates to a document of value, a transfer material and method for producing such security elements and documents of value as well as a method and an apparatus for checking such a security element or document of value. According to the invention the security element has at least two magnetic materials, wherein the magnetic materials have different coercive field strengths and are applied onto and/or incorporated in the security element in such a manner that their remanence is equally high.

20 Claims, 3 Drawing Sheets

(56) References Cited

FOREIGN PATENT DOCUMENTS

Figure 1:
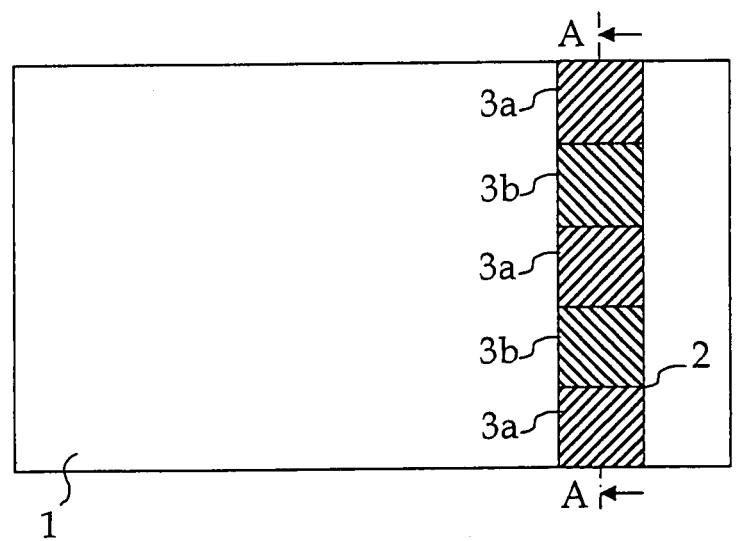

| | | |
|---|---|---|
| DE | 27 54 267 | 6/1978 |
| DE | 28 34 287 | 2/1980 |
| DE | 195 21 048 A1 | 12/1996 |
| DE | 195 35 019 A1 | 3/1997 |
| DE | 100 49 431 A1 | 4/2002 |
| DE | 698 23 059 T2 | 8/2004 |
| EP | 0 428 779 A1 | 5/1991 |
| EP | 0 748 896 A1 | 12/1996 |
| FR | 2 819 610 A1 | 7/2002 |
| GB | 1 541 579 | 3/1979 |
| JP | 6334727 A | 2/1988 |
| JP | 63244401 A | 10/1988 |
| JP | 07107738 A | 4/1995 |
| JP | 2004125526 A | 4/2004 |

\* cited by examiner

SECURITY ELEMENT COMPRISING MAGNETIC MATERIALS HAVING THE SAME REMANENCE AND A DIFFERENT COERCIVE FIELD INTENSITY

The invention relates to a security element for protecting documents of value, which has magnetic material. Furthermore, the invention relates to a document of value, a transfer material and method for producing such security elements and documents of value as well as a method and an apparatus for checking such a security element or document of value.

Documents of value within the terms of the invention can be bank notes, but also share certificates, deeds, stamps, checks, admission tickets, tickets, flight tickets, identity cards, visa stickers and the like as well as labels, seals, packagings, security paper or other elements for the product protection. The simplifying designation "document of value" or "security element" will hereinafter therefore always include documents of the stated type.

It is known that bank notes have magnetic material, which is used for the verification of the authenticity of the bank notes. Such magnetic material is for example a component of printing inks and is applied onto the bank notes during the printing of the bank notes. The distribution of the magnetic material produced in the printing can be determined and can be compared to a reference value in order to check the authenticity of the bank notes. It is furthermore known that magnetic material can be contained in security elements applied onto the bank note. Thus for example security threads can have magnetic material, which can also be applied in such a manner that the security threads have a coding which can be used for checking the authenticity of the bank note and/or to determine the type of bank note (currency, denomination).

It is a problem of such security elements or documents of value with magnetic material that the magnetic material and thus codings contained therein can be detected at any time. This results in the danger that the security elements or documents of value can be forged without any major problems, since the distribution of the magnetic material can be imitated due to its easy detectability.

The invention is therefore based on the problem of creating a document of value, a transfer element and a security element which shall be simple to produce and guarantee a high degree of protection from forgery.

It is further the problem of the invention to provide methods for producing such a security element and document of value as well as a method and an apparatus for checking the security element or document of value.

These problems are solved by the features of the independent claims. Developments are subject of the subclaims.

According to the invention the security element has at least two magnetic materials, wherein the magnetic materials have different coercive field strengths and are applied onto and/or incorporated in the security element in such a way that their remanence is equal.

The equal remanence of the magnetic materials is preferably achieved by different layer thicknesses and/or different concentrations of the magnetic materials.

For the magnetic materials according to the invention within the framework of the invention numerous variation possibilities are expedient. Thus the magnetic materials can be provided in certain areas, in particular in the form of characters or patterns, wherein it is especially preferred to apply the different materials directly adjoining each other.

The security element can either be produced directly on the document of value or prepared on a separate substrate. With respect to the material used, the document of value or the separate substrate, on which the security element is located, is in no way restricted. But preferably it is paper or plastic, also in the form of foils. In the case of a separate substrate the security element can be designed, for example, as a self-supporting label, preferably on a plastic substrate. In particular, the security element is designed in the form of a security thread.

Since in some cases it may be difficult to provide the document of value directly with the magnetic materials, therefore, alternatively, it may be expedient to prepare the structure of the security element at least partially on a transfer material.

Therein the magnetic materials of the security element can be applied onto and/or incorporated in a substrate in an endless form, which substrate is or will be connected with a carrier tape. The fastening as a security element on a document of value to be protected is effected with the aid of an adhesive layer, which either is applied onto the document of value or onto the topmost layer of the transfer material. Preferably, for this a hot-melt adhesive is used. In order to determine the outline form of the security element, there either can be provided an adhesive layer only in the areas to be transferred, or the adhesive, such as for example a hot-melt adhesive, is activated only in the areas to be transferred. After the transfer the carrier tape of the transfer material is stripped off and merely the security element remains on the document of value to be secured.

The document of value, onto which the security element is applied, can be, for example, a security paper, a security document, but also product packagings. Other objects of value, for which a protection in terms of security is required, of course can also be provided with the security element according to the invention.

Further advantages and embodiments of the invention are explained in more detail with reference to the Figures. The proportions (in particular layer thicknesses) shown in the Figures do not necessarily correspond to the dimensions present in reality and primarily serve for the improvement of clarity.

For clarity's sake the invention is explained in more detail only with reference to a bank note. But it is obvious that the invention can be used without any problems for the above-mentioned documents of value.

Figure 2:
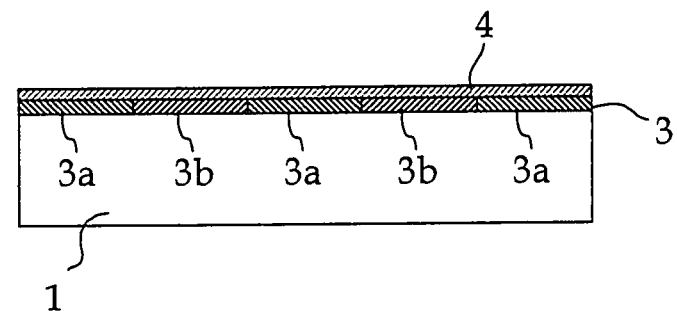
Figure 3:
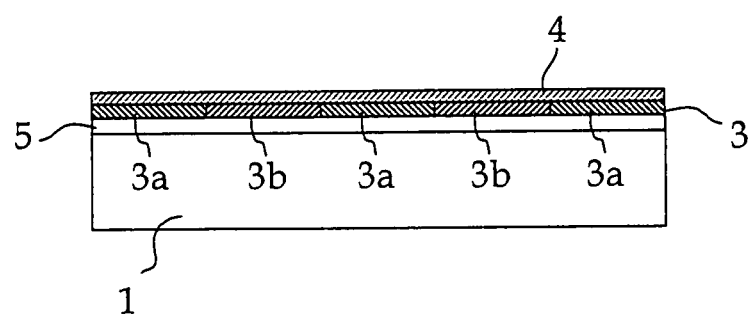
Figure 4:
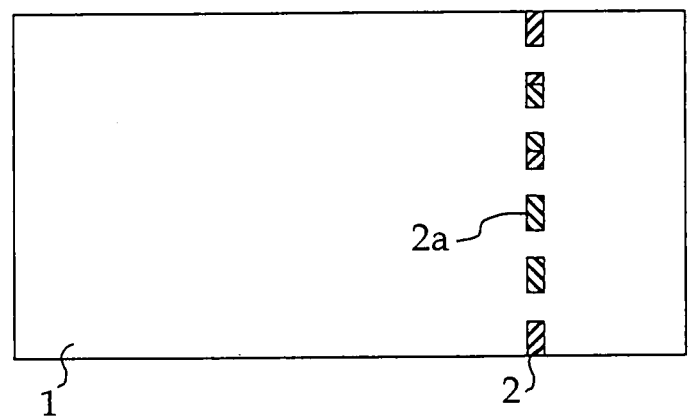
Figure 5:
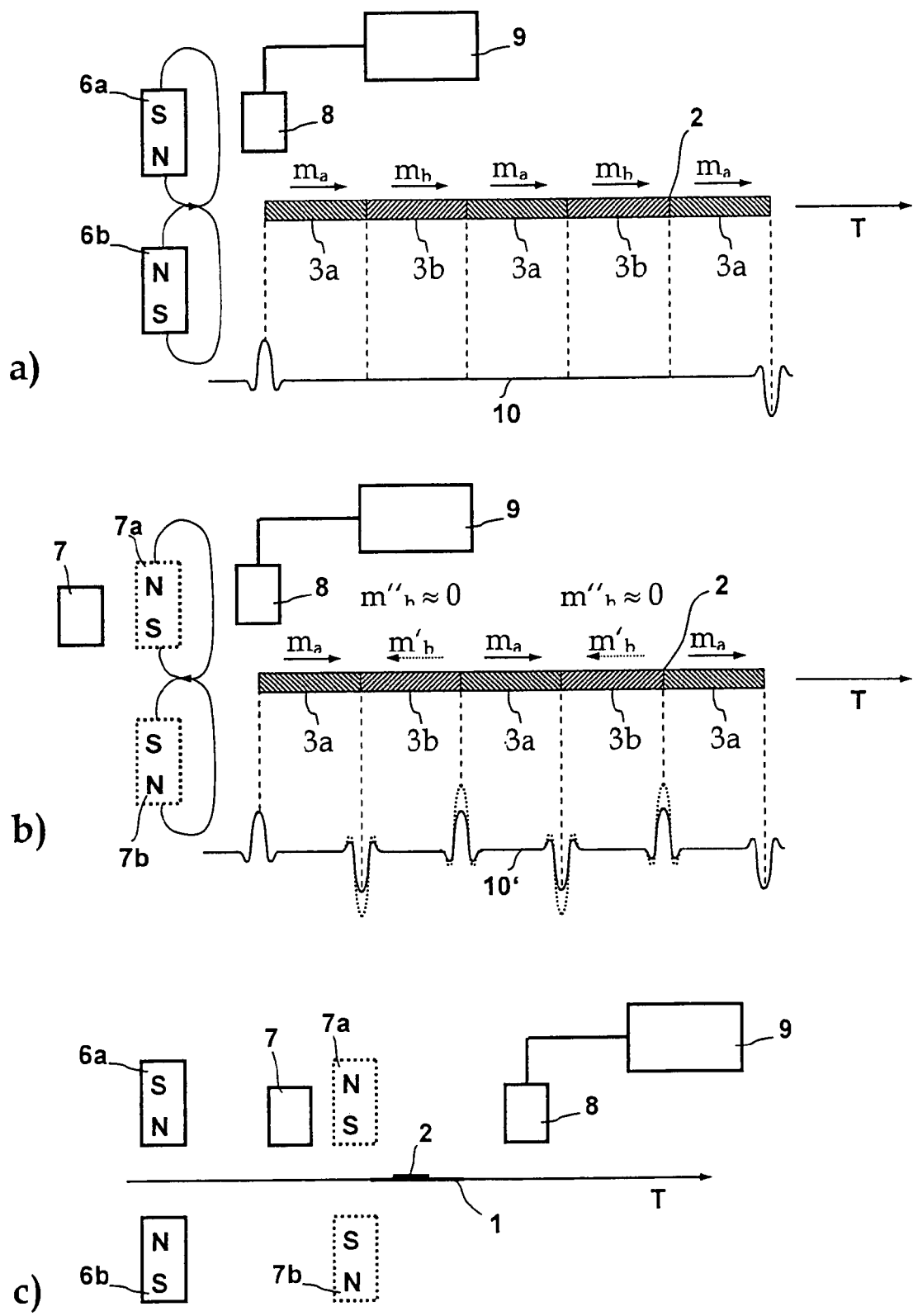
Figure 6:
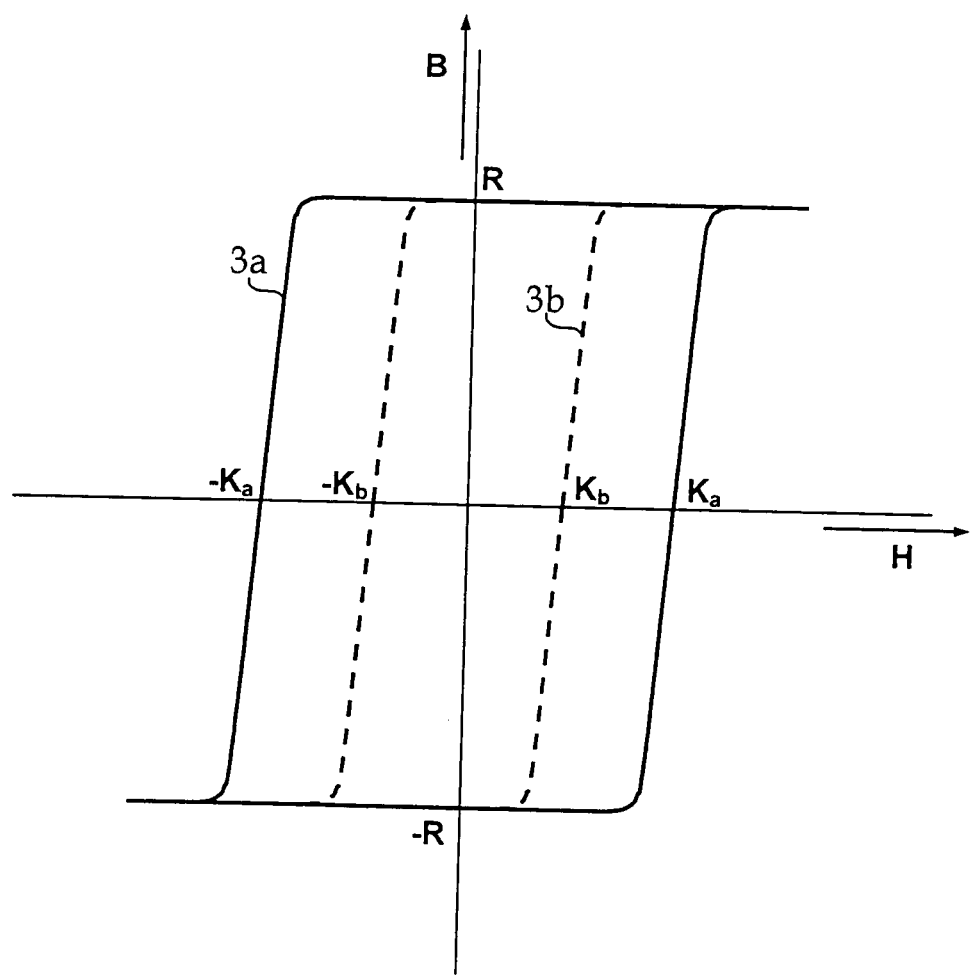

The figures are described as follows:

FIG. 1 a bank note with a security element according to the invention,

FIGS. 2 and 3 various embodiments of the security element according to FIG. 1 in cross section, FIG. 4 a further embodiment of a bank note with a security element according to the invention, FIG. 5 an embodiment of an apparatus for checking the security element according to the invention, and FIG. 6 exemplary hysteresis curves of magnetic materials used for the security element according to the invention.

FIG. 1 shows a bank note 1 made of paper or plastic, which is provided with a security element 2 in the form of a strip extending over the entire width of the bank note 1. The bank note 1 of course can have further security features, such as watermark, steel gravure print, security thread, luminescent prints, etc.

The security element 2 is disposed on the bank note 1, e.g. printed, bonded, incorporated in the bank note 1 etc. The security element 2 has areas with magnetic materials 3*a*, 3*b*, which have different coercive field strengths. However, the remanence resulting for the areas 3*a*, 3*b* is equally high. This can be achieved e.g. by a corresponding choice of layer thickness of the areas 3a, 3b and/or by a corresponding choice of concentration of the magnetic materials 3a, 3b in the areas.

Some preferred embodiments are explained in more detail with reference to the FIGS. 2 and 3, which show the bank note 1 in cross section along the dash-dotted line A-A, so as to illustrate the structure of the security element 2.

According to FIG. 2 the paper substrate or plastic substrate of the bank note 1 is provided with a layer 3 with different magnetic materials 3a, 3b in the form of surface areas, characters, patterns, etc. In order to improve the applying of the layer 3, e.g. by printing, in particular for a paper substrate it can be provided that a so-called primer layer is applied onto the paper substrate. The primer layer can be, for example, a colorless plastic layer or an ink layer, the surface of which has an only low roughness.

With certain embodiments, e.g. security elements which when used are subject to a heavy mechanical or chemical load, it is expedient to cover the magnetic materials 3a, 3b with a protection layer 4. The protection layer 4 can be a foil laminated over the security element 2 or a protective lacquer layer. Therein the protective lacquer layer can be applied all-over or in partial areas. For this purpose e.g. UV lacquers, hybrid lacquers, oil-based lacquers or dispersion lacquers of the one- or two-component type can be used. The protective lacquer layer preferably is printed, e.g. by flexographic printing or offset printing.

Likewise, the security element 2 can be a separate element which is adapted to be applied onto the bank note 1. The separate security element 2 can have a structure which corresponds to the structure described with reference to FIG. 3. In this case a substrate 5 of the security element 2, e.g. a plastic foil, is bonded to the bank note 1. The substrate 5 of the security element 2 has a layer 3 with magnetic materials 3a, 3b. For this purpose the plastic forming the substrate 5 can be a hot-melt adhesive. For the protection of the layer 3 a protection layer 4 can be provided.

Deviating therefrom, in and/or onto the substrate 5 a layer 3 with magnetic materials 3a, 3b can be applied, onto which finally an adhesive layer 6 is applied, by means of which the security element 2 is fastened to the bank note 1. The adhesive used for this purpose can be a hot-melt adhesive. In this case an additional protective layer can be omitted, since such layer is formed by the substrate 5.

In all cases described above instead of onto the security element 2 the adhesive can also be applied onto the bank note 1 in order to fasten the security element 2 to the bank note 1.

A further embodiment of a bank note 1 with security element 2 is shown in FIG. 4. The security element 2 at least partially is embedded in the substrate of the bank note 1, so that the security element 2, which e.g. is a security thread, is visible only in certain areas 2a, so-called "windows". However, the security element 2 can also be completely embedded in the substrate of the bank note 1. In both cases the magnetic materials 3a, 3b can be detected.

The security element 2 can also be designed as a transfer material, with a structure such as described with reference to the FIGS. 1 to 3. In this case the layer structure is applied in reverse order onto a transfer material. The security element 2 is applied onto the bank note with the help of the transfer material and the transfer material thereafter is entirely or partially removed.

The security element 2 can also be designed as a so-called planchet, which preferably is incorporated in the surface of the bank note substrate.

As described above the security element 2 can be produced directly on the bank note 1 or provided as a separate security element 2 and fastened to the bank note 1. But it can also be provided to provide a separate security element 2, whose structure is not completed until the security element 2 has been fastened to the bank note 1, e.g. is provided with a protection layer.

FIG. 5 shows an embodiment of an apparatus for checking the security element 2 according to the invention.

FIG. 5a shows a first magnetizing device 6, which consists of two magnets 6a and 6b. In the shown example the magnets 6a and 6b are arranged with their north poles pointing toward each other. However, it is also possible to arrange the magnets 6a and 6b with their south poles pointing toward each other. Through the gap formed between the magnets 6a and 6b a not shown transportation device can guide the bank notes to be checked with the security element 2 along a transport direction T. The security element 2 preferably has areas adjoining each other with magnetic materials 3a, 3b which have different coercive field strengths, whereas their remanence is equally high.

In FIG. 6 exemplary hysteresis curves of magnetic materials 3a and 3b used for the security element 2 according to the invention are shown. As it can be clearly recognized, the first magnetic material 3a has a coercive field strength $K_a$ which is higher than the coercive field strength $K_b$ of the second magnetic material 3b. The remanence R of the two magnetic materials 3a and 3b, however, is equally high, wherein slight deviations are admissible. The used magnetic materials 3a and 3b are magnetically hard materials, which can e.g. be present in the form of pigments, in order to be incorporated in the security element 2 in the above-described manner. The magnetic materials 3a and 3b can for example be $Fe_3O_4$ magnet pigments, which are available with different coercive field strengths, e.g. from the company BASF. For example the first magnetic material 3a, with the higher coercive field strength $K_a$, can have a coercive field strength of 28 kA/m, whereas the second magnetic material 3b, with the lower coercive field strength $K_b$, can have a coercive field strength of 18 kA/m or 21 kA/m.

The first magnetizing device 6 shown in FIG. 5a has a field strength which is higher than the highest coercive field strength of the used magnetic materials 3a and 3b, thus higher than the coercive field strength $K_a$ of the first magnetic material 3a. By this means, during the passage of the bank note or of the security element 2 both the first magnetic material 3a and the second magnetic material 3b are magnetized, so that the magnetic materials 3a and 3b have an orientation $m_a$ and $m_b$, corresponding to the orientation of the first magnetizing device 6.

When in the further course the bank note or the security element 2 is transported past a magnet sensor 8, each change of the magnetic field of the security element 2 results in an impulse, which can be evaluated by an evaluation device 9, for example a microcomputer, in order to be able to e.g. make statements on the authenticity and/or the type of the bank note. Since, as described above, the remanence of both magnetic materials 3a and 3b is equally high, and since both magnetic materials 3a and 3b have a homogenous orientation $m_a$ and $m_b$, the signal 10 provided by the magnet sensor 8 shows impulses only at the start and at the end of the security element 2.

In FIG. 5b a second magnetizing device 7 is shown, which consists of two magnets 7a and 7b. In the shown example the magnets 7a and 7b are arranged with their south poles pointing toward each other. Generally, the orientation of the magnets 7a and 7b is to be chosen in such a way that it is contrary to the orientation of the magnets 6a and 6b of the first magnetizing device 6. Through the gap created between the magnets 7a and 7b the not shown transportation device can guide the bank note to be checked with the security element 2 along the transport direction T. The magnetic materials 3a and 3b have the orientation $m_a$ and $m_b$ described above with reference to FIG. 5a. The second magnetizing device 6 has a field strength which is higher than the coercive field strength $K_b$ of the used second magnetic material 3b, but which is lower than the coercive field strength $K_a$ of the first magnetic material 3a. Thereby during the passage of the bank note or of the security element 2 the magnetization of only the second magnetic material 3b is changed, so that the magnetic materials 3a and 3b have a different orientation $m_a$ and $m'_b$. The signal 10' provided by the magnet sensor 8 therefore shows additional impulses in the areas of the security element 2 in which the magnetic materials 3a and 3b adjoin each other.

As is additionally shown in FIG. 5b, the second magnetization device 7 can alternatively also be formed by an electromagnet, which generates an alternating magnetic field whose field strength is also higher than the coercive field strength $K_b$ of the used second magnetic material 3b, but which is lower than the coercive field strength $K_a$ of the first magnetic material 3a. Thereby during the passage of the bank note or of the security element 2 only the second magnetic material 3b is demagnetized, so that the first magnetic material 3a still has its orientation $m_a$, whereas the second material 3b no longer has an orientation $m''_b$. The signal 10' provided by the magnet sensor 8 therefore in this case additionally shows impulses in the areas of the security element 2 in which the magnetic materials 3a and 3b adjoin each other. However, the impulses are smaller than in the case described beforehand, since the magnetic material 3b no longer has an orientation $m''_b$, and consequently the change of the field strength of the magnetic field of the security element 2 at the borders between the magnetic materials 3a and 3b is smaller.

In FIG. 5c an exemplary complete structure of an apparatus for checking the security element 2 according to the invention is shown. The apparatus is composed of the components shown in FIGS. 5a and 5b, namely the first magnetizing device 6, the second magnetizing device 7, which can be optionally formed by magnets 7a, 7b or by an electromagnet 7, as well as the magnet sensor 8 with the evaluation device 9. By means of a not shown transportation system bank notes 1 or security elements 2 to be checked can be transported along the transport direction T through the apparatus. The magnet sensor 8 generates the signal 10' described above in connection with FIG. 5b, which signal is used by the evaluation device 9 for example for checking the authenticity and/or the type (currency, denomination) of the bank note 1.

It is obvious that, deviating from the description so far, a plurality of modifications and variations is possible.

Instead of the described use of two magnetic materials 3a and 3b for the security element 2 also three, four or more materials can be used. In this case it is obvious that for the checking of such a security element three, four or more magnetizing devices have to used, whose field strengths have to be chosen in accordance with the coercive field strengths of the used magnetic materials. Likewise, the magnetizing devices have to be disposed in accordance with their field strength, i.e. viewed in the transport direction, the magnetizing device with the highest field strength has to be disposed in the first place, whereas the magnetizing device with the lowest field strength has to be disposed in the last place. Therein, account must also be taken of the described, respectively contrary orientation of the magnetic field of the used magnetizing devices.

Furthermore, in addition to the mentioned production of the security element by means of printing with inks containing different magnetic pigments, any other production method is possible that permits the selective production of areas with different coercive field strengths, wherein all areas shall have an essentially equally high remanence. Therein the magnetic materials can be applied onto and/or incorporated in the substrate.

Likewise, it is possible to choose any desired size or arrangement of the areas with different coercive field strengths forming the security element, e.g. due to factors resulting from the design of the bank note having the security element.

Likewise, it is possible to arrange the magnetizing devices 6 and 7 deviating from the description so far. The magnets 6a and 6b of the first magnetizing device 6 can for example also be arranged with their north pole and south pole pointing toward each other. In contrast to the magnetization $m_a$, $m_b$ shown in FIG. 5a, which is effected parallel to the plane of the bank note or of the security element 2, in this case the resulting magnetization is effected perpendicular to the plane of the bank note or of the security element 2. In the case that also for the second magnetizing device 7 magnets 7a and 7b are used, these have to be arranged contrarily of course, i.e. in this case the south pole has to point toward the north pole. The arrangement of the magnets 6a and 6b or of the magnets 7a and 7b described above can of course also be effected in reverse order, as long as the result is the above-described change of magnetization by the second magnetizing device 7. It is likewise possible—as described above—to form the second magnetizing device 7 by means of an electromagnet with an alternating field.

In the case that the magnetizing devices 6 and 7 are formed by permanent magnets, these can for example consist of SmCo, NdFeB or SrFe and have the described field strengths.

Likewise, it can be provided to eliminate the detectable different orientation $m_a$ and $m_b$ after the checking of the security feature formed by means of the magnetic materials 3a and 3b, so that a coincidental detection of the security feature is rendered impossible. For this purpose, a deleting process can be effected, in which the different orientations $m_a$ and $m_b$ are canceled. This can be achieved in such a way that, viewed in the transport direction T, a third magnetizing device (not shown) is disposed downstream from the magnet sensor 8. The third magnetizing device can for example have a field strength which is higher than the highest coercive field strength of the used magnetic materials 3a and 3b, thus higher than the coercive field strength $K_a$ of the first magnetic material 3a. Thereby during the passage of the bank note or of the security element 2 both the first magnetic material 3a and the second magnetic material 3b are magnetized, so that the orientation $m_a$ and $m_b$ of the magnetic materials 3a and 3b is equal. For this purpose the third magnetizing device can generate a steady or an alternating field alternatively.

The invention claimed is:

1. Security element for securing objects of value, wherein the security element comprises:
    magnetic materials and at least two different magnetic areas, which have different coercive field strengths,
    wherein a first magnetic area has a first magnetic material, the first magnetic material having a first coercive field strength, and a second magnetic area has a second magnetic material, the second magnetic material having a second coercive field strength,
    wherein the second coercive field strength is different than the first coercive field strength, and
    wherein the remanences of the magnetic areas are essentially equal.

2. Security element according to claim 1, wherein the different magnetic materials have at least one of different layer thicknesses and different concentrations.

3. Security element according to claim 1, wherein the magnetic materials are present in certain areas of the security element.

4. Security element according to claim 1, wherein the security element is a security thread or a planchet.

5. Document of value with a security element, said security element comprising:
- magnetic materials and at least two different magnetic areas, which have different coercive field strengths,
- wherein a first magnetic area has a first magnetic material, the first magnetic material having a first coercive field strength, and a second magnetic area has a second magnetic material, the second magnetic material having a second coercive field strength,
- wherein the second coercive field strength is different than the first coercive field strength, and
- wherein the remanences of the magnetic areas are essentially equal.

6. Document of value according to claim 5, wherein the different magnetic materials have at least one of different layer thicknesses and different concentrations.

7. Document of value according to claim 5, wherein the magnetic materials are present in certain areas of the security element.

8. Document of value according to claim 5, wherein the security element is a label.

9. Document of value according to claim 5, wherein the document of value is a security paper, a security document or a product packaging.

10. Transfer material for producing a security element, comprising:
- a carrier material on which at least two different magnetic materials are disposed to form at least two different magnetic areas, said magnetic areas having different coercive field strengths, wherein a first magnetic area has a first magnetic material, the first magnetic material having a first coercive field strength, and a second magnetic area has a second magnetic material, the second magnetic material having a second coercive field strength,
- wherein the second coercive field strength is different than the first coercive field strength, and
- wherein the remanences of the magnetic areas are essentially equal.

11. Transfer material according to claim 10, wherein the carrier material is in the form of a hot stamping foil.

12. Method for producing an object of value or security element, comprising the steps:
- providing a substrate,
- applying at least two magnetic materials onto the substrate as at least two different magnetic areas, said areas having different coercive field strengths,
- wherein a first magnetic area has a first magnetic material, the first magnetic material having a first coercive field strength, and a second magnetic area has a second magnetic material, the second magnetic material having a second coercive field strength,
- wherein the second coercive field strength is different than the first coercive field strength,
- and wherein the remanences of the magnetic areas are essentially equal.

13. Method for checking an object of value with a security element, said security element comprising at least two different magnetic areas which have different coercive field strengths, wherein a first magnetic area has a first magnetic material, the first magnetic material having a first coercive field strength, and a second magnetic area has a second magnetic material, the second magnetic material having a second coercive field strength, wherein the second coercive field strength is different than the first coercive field strength, and wherein the remanences of the magnetic areas are essentially equal, comprising the steps:
- magnetizing the magnetic materials in the magnetic areas by means of a first magnetic field, whose field strength is higher than the highest coercive field strength of the magnetic materials,
- magnetizing the magnetic materials in the magnetic areas by means of at least one second magnetic field, whose field strength is higher than the lowest coercive field strength and lower than the next higher coercive field strength of the magnetic materials, and
- determining the changes of the orientation of the magnetic field emanating from the security element.

14. Method according to claim 13, wherein the orientation of the second magnetic field is contrary to the orientation of the first magnetic field.

15. Method according to claim 13, wherein the second magnetic field is an alternating field.

16. Method according to claim 13, wherein after the checking, the magnetic materials are magnetized by means of a third magnetic field, whose field strength is higher than the highest coercive field strength of the magnetic materials.

17. Apparatus for checking an object of value with a security element, said security element having at least two different magnetic areas which have different coercive field strengths, wherein a first magnetic area has a first magnetic material, the first magnetic material having a first coercive field strength, and a second magnetic area has a second magnetic material, the second magnetic material having a second coercive field strength, wherein the second coercive field strength is different than the first coercive field strength, and wherein the remanences of the magnetic areas are essentially equal, comprising:
- a first magnetizing device, whose field strength is higher than the highest coercive field strength of the magnetic materials in the magnetic areas,
- at least one second magnetizing device, whose field strength is higher than the lowest coercive field strength, and lower than the next higher coercive field strength of the magnetic materials, and
- a magnet sensor with an evaluation device, which is arranged to enable determination of changes of the orientation of the magnetic field emanating from the security element.

18. The apparatus according to claim 17, wherein the orientation of the magnetic field of the second magnetizing device is contrary to the orientation of the magnetic field of the first magnetizing device.

19. The apparatus according to claim 17, wherein the second magnetizing device comprises an electromagnet, which is arranged to generate an alternating field.

20. The apparatus according to claim 17, including a third magnetizing device, whose field strength is higher than the highest coercive field strength of the magnetic materials, disposed downstream from the magnet sensor.

* * * * *